(12) United States Patent
Oechslen et al.

(10) Patent No.: US 12,562,621 B2
(45) Date of Patent: Feb. 24, 2026

(54) DRIVE UNIT

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 294 days.

(21) Appl. No.: 18/321,808

(22) Filed: May 23, 2023

(65) Prior Publication Data

US 2023/0387754 A1    Nov. 30, 2023

(30) Foreign Application Priority Data

May 30, 2022    (DE) .......................... 102022113564.0

(51) Int. Cl.
| | |
|---|---|
| *H02K 9/193* | (2006.01) |
| *H02K 5/20* | (2006.01) |
| *H02K 9/26* | (2006.01) |
| *B60K 11/02* | (2006.01) |

(52) U.S. Cl.
CPC ............. *H02K 9/193* (2013.01); *H02K 5/203* (2021.01); *H02K 9/26* (2013.01); *B60K 11/02* (2013.01)

(58) Field of Classification Search
CPC ................................... H02K 1/20; H02K 3/24
See application file for complete search history.

(56) References Cited

U.S. PATENT DOCUMENTS

| | | | |
|---|---|---|---|
| 2009/0179509 A1 | 7/2009 | Gerundt et al. | |
| 2023/0374932 A1* | 11/2023 | Trümper | ................ F01P 11/029 |

FOREIGN PATENT DOCUMENTS

| | | | | |
|---|---|---|---|---|
| DE | 4133287 A1 * | 4/1993 | ............ | F01P 11/029 |
| DE | 102005032633 A1 | 1/2007 | | |
| DE | 102013019687 B3 | 3/2015 | | |
| DE | 102019117637 A1 * | 1/2021 | ......... | F16H 57/0476 |

(Continued)

OTHER PUBLICATIONS

DE-4133287-A1 Machine Translation (Year: 1993).*

(Continued)

*Primary Examiner* — Oluseye Iwarere
*Assistant Examiner* — Masoud Vaziri
(74) *Attorney, Agent, or Firm* — LEYDIG, VOIT & MAYER, LTD.

(57) ABSTRACT

A drive unit includes an electric motor for propulsion and a cooling system. The electric motor includes a stator assembly and a rotor assembly, the stator assembly including a housing, a core with grooves, and a winding assembly. The winding assembly extends through the grooves. The housing includes a housing inlet and outlet. The cooling system includes a first cooling circuit to enable a direct cooling of the winding assembly. The first cooling circuit includes an expansion tank assembly, including a tank, a tank inlet and outlet, and a volume change assembly. The volume change assembly enables change of the total volume of the first cooling circuit as a function of pressure in the first cooling circuit such that, as the pressure in the first cooling circuit increases, a first volume is increased and, as the pressure in the first cooling circuit decreases, the first volume is reduced.

17 Claims, 3 Drawing Sheets

(56) References Cited

FOREIGN PATENT DOCUMENTS

| | | | | | |
|----|----|----|----|----|----|
| DE | 102020114596 | A1 | * | 12/2021 | ............. H02K 11/20 |
| DE | 102022103357 | B4 | * | 10/2023 | ............. B60K 11/02 |
| EP | 3184336 | A1 | | 6/2017 | |
| WO | WO 2019182622 | A1 | | 9/2019 | |

OTHER PUBLICATIONS

DE-102019117637-A1 Machine Translation (Year: 2021).*
DE-102022103357-B4 (Year: 2023).*
DE-102020114596-A1 Machine Translation (Year: 2021).*

* cited by examiner

DRIVE UNIT

CROSS REFERENCE TO RELATED APPLICATIONS

This application claims benefit to German Patent Application No. DE 10 2022 113 564.0, filed on May 30, 2022, which is hereby incorporated by reference herein.

FIELD

The invention relates to a drive unit and an electric vehicle.

BACKGROUND

DE 10 2013 019 687 B3 discloses a cooling system for a hybrid vehicle comprising an oil circuit and a water cooling circuit.

EP 3 184 336 A1 discloses a cooling system for an electric vehicle having an electric motor, an inverter, and a transmission in which the inverter and electric motor are cooled by means of a first oil circuit.

WO 2019/182 622 A1 discloses a cooling system for an electric vehicle comprising a glycol-water cooling circuit and an oil circuit.

DE 10 2005 032 633 A1 discloses a cooling system for an electromechanical component and a transmission with cooling done by a transmission oil.

SUMMARY

In an embodiment, the present disclosure provides a drive unit for an electric vehicle, comprising an electric motor for propulsion and a cooling system. The electric motor comprises a stator assembly and a rotor assembly, wherein the stator assembly comprises a stator housing, a stator core with grooves, and a winding assembly. The winding assembly extends through the grooves. The stator housing comprises a stator housing inlet and a stator housing outlet. The grooves are fluidically connected to the stator housing inlet and with the stator housing outlet. The cooling system comprises a first cooling circuit, which is connected to the stator housing inlet and to the stator housing outlet so as to enable a direct cooling of the winding assembly. The first cooling circuit comprises an expansion tank assembly, the expansion tank assembly comprising an expansion tank, an expansion tank inlet, an expansion tank outlet, and a volume change assembly. The expansion tank is connected to the first cooling circuit via the expansion tank inlet and the expansion tank outlet. The volume change assembly has a first volume and is configured as a closed volume change assembly without fluidic connection to an outer environment of the drive unit. The volume change assembly is configured to enable a change of the first volume and thus of a total volume of the first cooling circuit as a function of the pressure in the first cooling circuit such that, as the pressure in the first cooling circuit increases, the first volume is at least partially increased and, as the pressure in the first cooling circuit decreases, the first volume is at least partially reduced.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
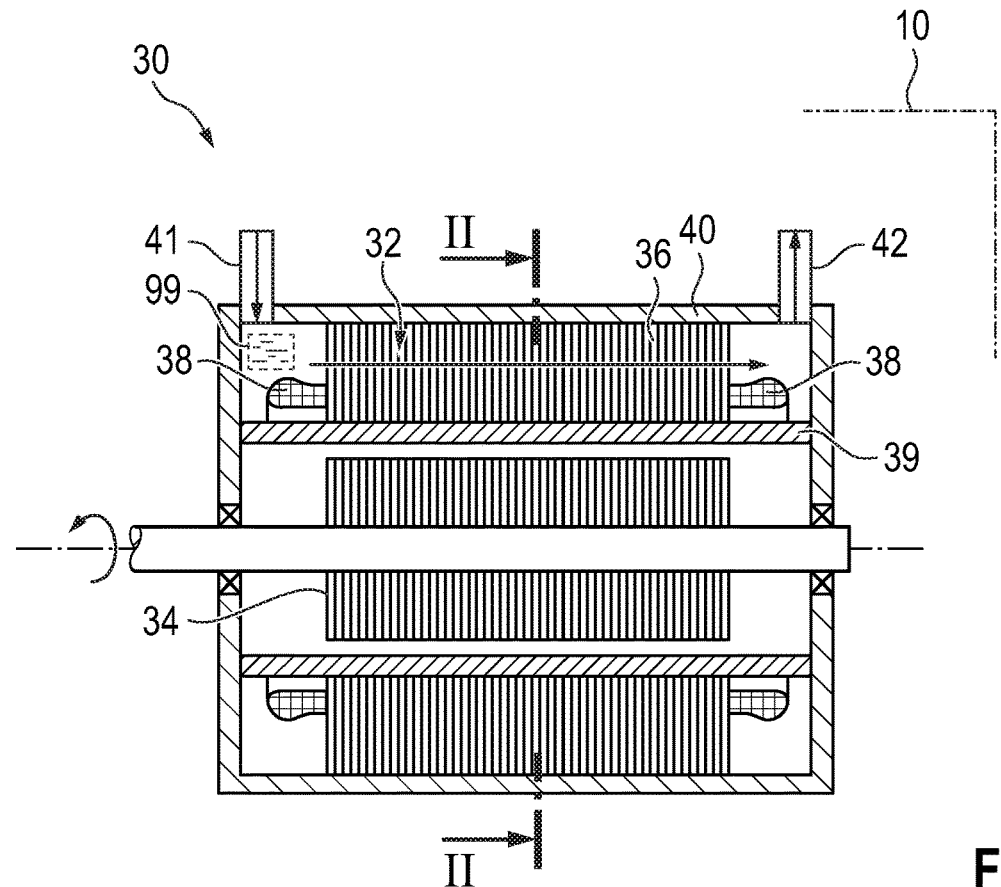
FIG. 1 illustrates a schematic longitudinal section, an electric motor.

In an embodiment, the invention provides a new drive unit and a new electric vehicle.

A drive unit for an electric vehicle, which comprises an electric motor for propulsion and a cooling system, which electric motor comprises a stator assembly and a rotor assembly, which stator assembly comprises a stator housing, a stator core with grooves, and a winding assembly, which winding assembly extends through the grooves, which stator housing comprises a stator housing inlet and a stator housing outlet, which grooves are fluidically connected to the stator housing inlet and with the stator housing outlet, which cooling system comprises a first cooling circuit, which is connected to the stator housing inlet and to the stator housing outlet so as to enable a direct cooling of the winding assembly, and which first cooling circuit comprises an expansion tank assembly, which expansion tank assembly comprises an expansion tank, an expansion tank inlet, an expansion tank outlet, and a volume change assembly, which expansion tank is connected to the first cooling circuit via the expansion tank inlet and the expansion tank outlet, which volume change assembly has a first volume and is configured as a closed volume change assembly without fluidic connection to the outer environment of the drive unit, which volume change assembly is configured so as to enable a change of the first volume and thus of the total volume of the first cooling circuit as a function of the pressure in the first cooling circuit in such a way that, as the pressure in the first cooling circuit increases, the first volume is at least partially increased and, as the pressure in the first cooling circuit decreases, the first volume is at least partially reduced. The direct cooling of the winding together with the volume change assembly allows a high-performance, yet compact, drive unit.

According to a preferred embodiment, the first cooling circuit comprises a first coolant. Providing a coolant allows for advantageous heat transfer and good heat transfer.

According to a preferred embodiment, the first coolant is a dielectric coolant. A dielectric coolant is particularly advantageous for cooling a live winding assembly, because it is electrically non-conductive or poorly conductive and the risk of a short circuit is reduced.

According to a preferred embodiment, the volume change assembly comprises a membrane, which membrane is configured so as to enable a volume change of the first volume by means of a shape change. Providing a membrane allows a good sealing of the first volume while allowing for a volume change.

According to a preferred embodiment, the membrane is configured as a flexible membrane. The membrane can thereby conform well to the pressure conditions due to a deformation.

According to a preferred embodiment, the membrane is arranged in the expansion tank. This allows a compact configuration of the drive unit.

According to a preferred embodiment, the membrane comprises a first side facing the expansion tank inlet and a second side opposite the first side, wherein the membrane is configured so as to produce a seal between the first side and the second side. Fluidically speaking, at least in the region of the volume change assembly, a closed cooling system results.

According to a preferred embodiment, the second side of the membrane is fluidically connected to the outer environment of the drive unit. The membrane can hereby deform towards the second side without an additional counter-pressure being created by the fluid on the second side.

According to a preferred embodiment, the second side of the membrane is not fluidically connected to the outer environment of the drive unit. The effect of harmful environmental substances from the outer environment on the membrane can hereby be avoided.

According to a preferred embodiment, the volume change assembly comprises a body having an element that is displaceable within the body, which body, together with the displaceable element, defines the first volume, and which displaceable element is configured so as to bring about a volume change of the first volume by a displacement relative to the body. Such a displaceable element allows for a defined volume change. For example, the body can be formed as a cylinder, but it can also have a non-round basic shape.

According to a preferred embodiment, the displaceable element comprises a sealing element, which sealing element is configured so as to enable a sealing of the region between the displaceable element and the body, wherein the sealing element is preferably configured as a sealing lip or as an O-ring. Such a sealing element results in a better seal in the region.

According to a preferred embodiment, the volume change assembly comprises a guide apparatus, which guide apparatus is configured so as to guide the displaceable element relative to the body. A movement that is defined in this way allows for a better seal between the displaceable element and the body.

According to a preferred embodiment, the volume change assembly comprises a spring element, which spring element is configured so as to apply a force onto the displaceable element, which force is configured so as to increase or decrease a pressure in the first volume. For example, if the conduits in the cooling circuit are more stable at higher pressure than at negative pressure, the pressure range can be shifted to an advantageous range by the spring element.

According to a preferred embodiment, the drive unit comprises a second cooling circuit and a pumping apparatus, which pumping apparatus comprises a first pump and a second pump, which first pump is configured so as to convey a first coolant in the first cooling circuit, and which second pump is configured so as to convey a second coolant in the second cooling circuit.

According to a preferred embodiment, the first coolant and the second coolant are different.

According to a preferred embodiment, the drive unit comprises a third cooling circuit, the first cooling circuit comprises a first heat exchanger, and the third cooling circuit is configured so as to cool the first heat exchanger.

According to a preferred embodiment, the second cooling circuit comprises a second heat exchanger and the third cooling circuit is configured so as to cool the second heat exchanger. The multiple use of the third cooling circuit leads to an improvement in efficiency.

An electric vehicle has such a drive unit. For vehicles, the drive unit is particularly well suited, because the safety of the entire drive unit is comparatively high.

Further details and advantageous further embodiments of the invention will emerge from the embodiment examples, which are described below and illustrated in the drawings and are not to be construed as limiting the invention in any way. It goes without saying that the features mentioned above and those yet to be discussed below can be used not only in the respectively specified combination, but also in other combinations or on their own, without leaving the scope of the present invention.

Parts that are the same or have the same effect bear the same reference numbers in the following and are generally described only once. The descriptions of all of the figures build on one another in order to avoid unnecessary repetitions.

FIG. 1 shows an electric motor 30 for the drive of an electric vehicle 10. Such an electric motor 30 is also referred to as a drive motor, and can preferably additionally operate as a generator.

The electric motor 30 has a stator assembly 32 and a rotor assembly 34. The stator assembly 32 has a stator housing 40, a collimator 39, a stator core 36, and a winding assembly 38.

The stator core 36 is typically configured as a sheet package.

Only the winding heads on the two axial sides of the stator core 36 are visible in the winding assembly 38 in the illustration.

The stator housing 40 has a stator housing inlet 41 and a stator housing outlet 42 via which the electric motor 30 can be connected to a coolant circuit. Schematically, a coolant 99 is drawn in.

Figure 2:
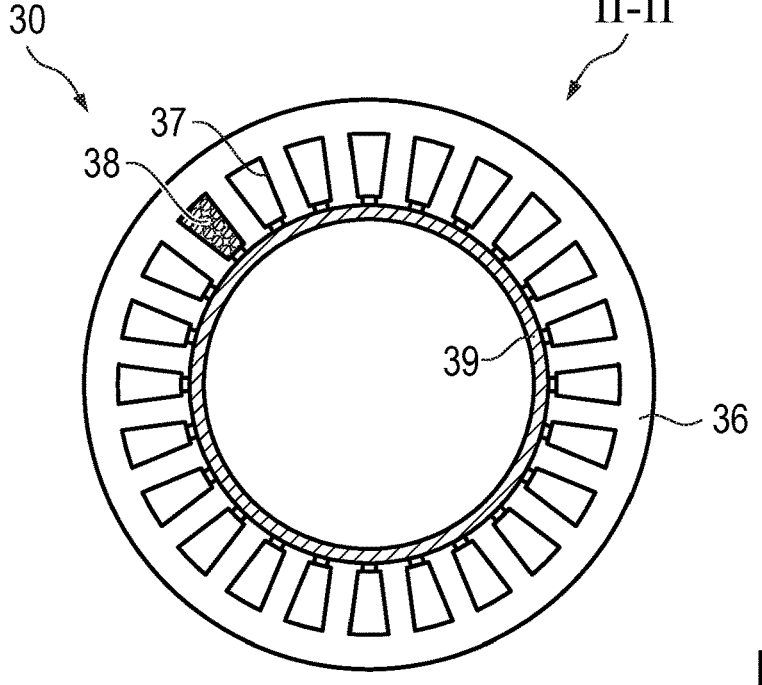
FIG. 2 illustrates a schematic transverse section, a stator assembly of the electric motor of FIG. 1.

FIG. 2 shows the electric motor 30 of FIG. 1 in a transverse section along line II-II of FIG. 1.

The stator core 36 has grooves 37 through which the winding assembly 38 extends, indicated schematically in a groove 37. Preferably, the collimator 39 is provided on the radially inner side of the stator core 36 in order to improve a seal against the inner rotor 34 (cf. FIG. 1). The grooves 37 are fluidically connected to both the stator housing inlet 41 and the stator housing outlet 42. This allows the coolant 99 of FIG. 1 to flow through the grooves 37 and cool the winding assembly 38 well. This is also referred to as direct cooling of the winding assembly 38. The coolant 99 flows in the grooves directly along the wires of the winding assembly 38 and cools them extensively.

Figure 3:
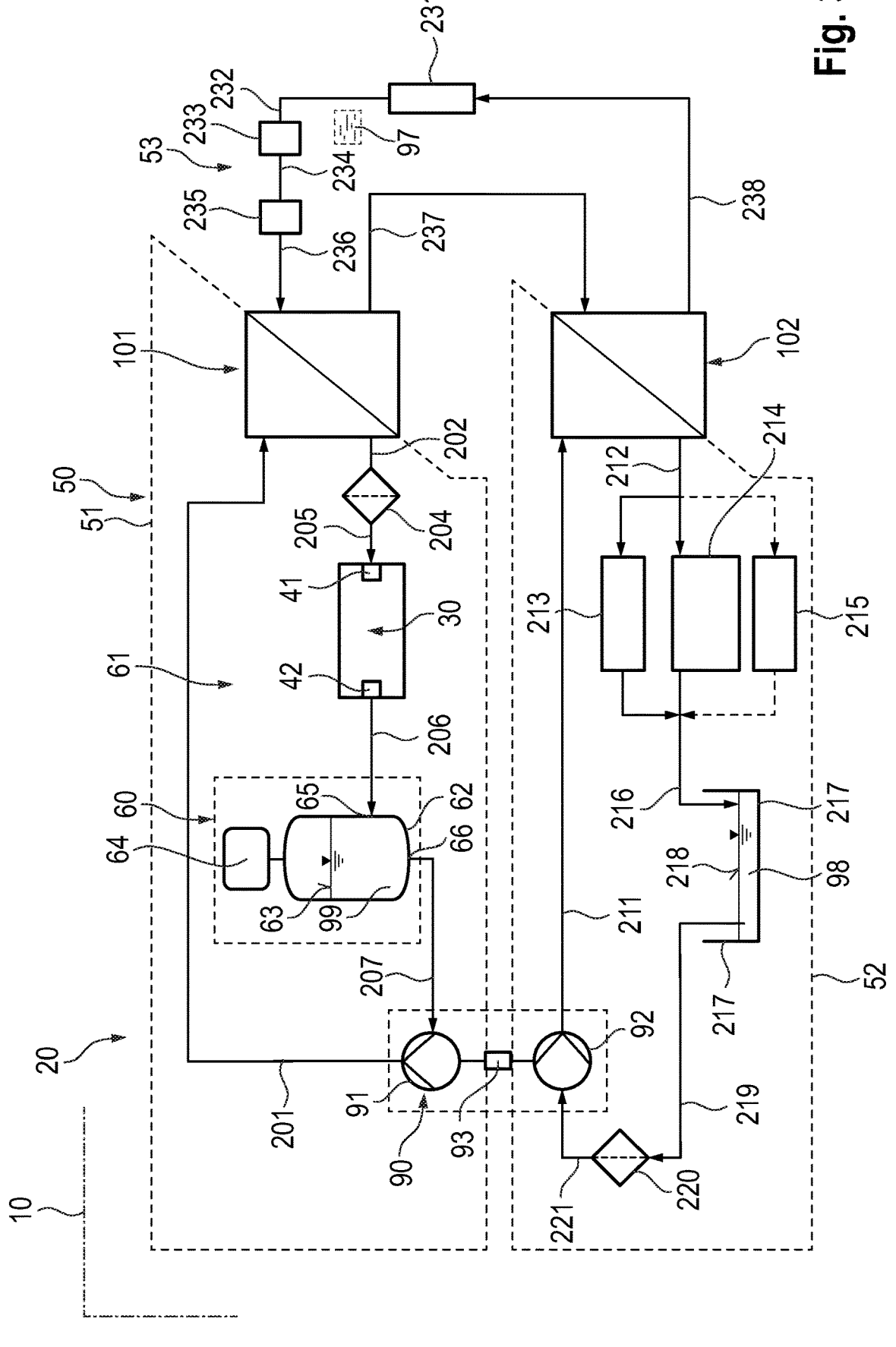
FIG. 3 illustrates a schematic view, a cooling system with the electric motor of FIG. 1 and with an expansion tank.

FIG. 3 shows an electric vehicle 10 having a drive unit 20 in a schematic view. The electric vehicle 10 can be a pure electric vehicle or can be a hybrid electric vehicle.

The drive unit 20 has the electric motor 30 and a cooling system 50.

The cooling system 50 has a first cooling circuit 51, a second cooling circuit 52, and a third cooling circuit 53. A pumping apparatus 90 comprises a first pump 91 and a second pump 92, as well as a control apparatus 93 for controlling the first pump 91 and the second pump 92.

In the embodiment example, the first cooling circuit 51 comprises the first pump 91, which is connected to a heat exchanger 101 via a conduit 201, and the heat exchanger 101 is connected to a filter 204 via a conduit 202.

The filter 204 is connected to the electric motor 30 via a conduit 205. The electric motor 30 is connected to an expansion tank assembly 60 via a conduit 206, and the expansion tank assembly 60 is connected to the first pump 91 via a conduit 207.

In the embodiment example, the conduit 205 is fed to the stator housing inlet 41 of the electric motor 30 and serves to cool the electric motor 30.

The expansion tank assembly 60 has an expansion tank 62 and a volume change assembly 64. The conduit 206 is connected to the expansion tank inlet 65, and the expansion tank outlet 66 is connected to the conduit 207. During operation, the expansion tank 62 is partially filled with the coolant 99, and the surface 63 is schematically indicated.

The volume change assembly 64 is configured so as to enable a change in the total volume of the first cooling circuit 51 such that, as the pressure in the first cooling circuit 51 increases, the total volume of the first cooling circuit 51 is at least partially increased and, as the pressure in the first cooling circuit 51 decreases, the total volume of the first cooling circuit is at least partially decreased. The changes in pressure can occur due to the coolant experiencing volume fluctuations as a result of temperature fluctuations.

The second pump 92 is connected to a heat exchanger 102 via a conduit 211, and the heat exchanger 102 is connected via a conduit 212 to apparatuses 213, 214, and 215 to be cooled. The apparatuses 213, 214, 215 to be cooled are connected to an oil sump 217 via a conduit 216, which can also be referred to as an oil pan. A coolant 98 for the second coolant circuit 52 is provided in the oil sump 217, the surface of which is schematically indicated 218. The oil sump 217 is connected to a filter 220 via a conduit 219, and the filter 220 is connected to the second pump 92 via a conduit 221.

In the embodiment example, the third coolant circuit 53 comprises a pump 231 connected to a heat exchanger 233 via a conduit 232. The heat exchanger 233 is connected to an apparatus 235 to be cooled via a conduit 234, for example a power electronics such as a pulse inverter, and the apparatus 235 is connected to the heat exchanger 101 via a conduit 236 in order to supply a schematically indicated coolant 97 of the third coolant circuit 53. The heat exchanger 101 is connected to the heat exchanger 102 via a conduit 237, and the heat exchanger 102 is connected to the pump 231 via a conduit 238. The coolant circuit 53 serves to cool the heat exchangers 101 and 102, and heat from the coolants 99 and 98 can be transferred to the coolant 97, or vice versa. Moreover, the third coolant circuit 53 can also have an expansion tank.

The coolant 97 is preferably a mixture comprising water and glycol, or pure water.

The coolant 98 is e.g. transmission oil or engine oil, and it can preferably additionally be used for lubrication.

The coolant 99 is used for the direct cooling of the electric motor 30 and is therefore preferably electrically non-conductive or poorly conductive. Preferably, the coolant 99 is a dielectric coolant. Dielectric coolants are advantageous because they are electrically non-conductive or at least poorly conductive and therefore can also be used in the electric motor 30 in order to cool the winding assembly 38. For example, coolant based on monoethylene glycol or based on a mixture of methyl nonafluoro-n-butylether with methyl nonafluoro-iso-butylether, which is sold as a coolant called R-7100, or based on hydrofluoroether, which is sold as a coolant called HFE-7100, are suitable.

Figure 4:
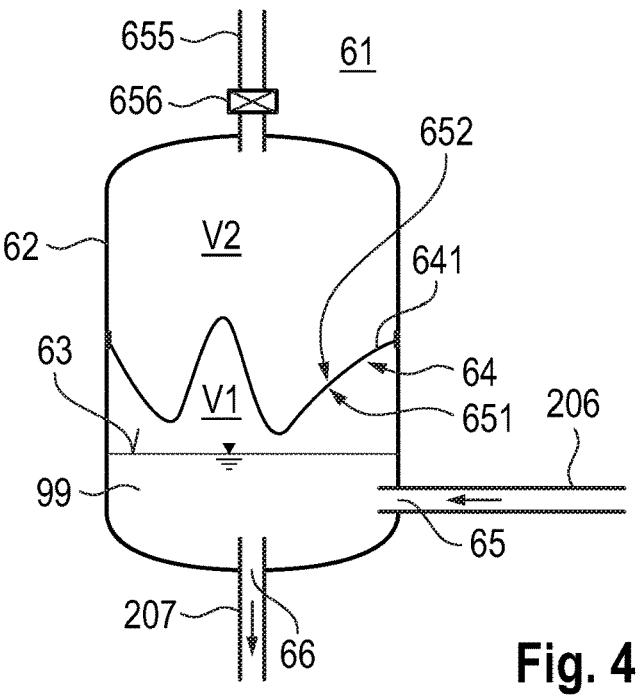
FIG. 4 illustrates a first embodiment of the expansion tank of FIG. 3.

FIG. 4 shows an embodiment example of the volume change assembly 64 of FIG. 3.

The expansion tank 62 is partially filled with the coolant 99, and the surface 63 is schematically indicated.

In the embodiment example, the volume change assembly 64 is provided in the expansion tank 62 and comprises a membrane 641. The membrane 641 is configured so as to enable a volume change of the first volume V1 by means of a shape change.

The membrane 641 is configured as a flexible membrane in the embodiment example.

The membrane 641 has a first side 651 facing the expansion tank inlet 65 and the expansion tank outlet 66 and a second side 652 opposite the first side. The membrane 641 is configured so as to produce a seal between the first side 651 and the second side 652.

In the embodiment example, in the first volume V1, coolant 99 as well as air or a coolant/air mixture are provided above the surface 63. Alternatively, only coolant 99 can be provided in the first volume V1, to the extent technically feasible.

On the second side 652 of the membrane 641, for example, air or another fluid is provided. Here, the second volume V2 on the second side 652 of the membrane 641 can be fluidically connected to the outer environment 61 of the drive unit 20 via an opening 655, or alternatively it can be separated from the outer environment 61 by the schematically indicated valve 656, or it can be not fluidically connected to the outer environment 61 of the drive unit 20.

A fluidic connection has the advantage that the membrane 641 can move towards the second volume V2 without an increase in pressure in the second volume V2. This allows the membrane 641 to move towards the second volume V2 without a great resistance.

An embodiment without a fluidic connection has the advantage that counter-pressure is created in the second volume V2, which allows a stronger volume increase of the coolant 99 in the first cooling circuit 51. In addition, entry of dirt through the closed opening 655 can be prevented.

As an alternative to the assembly of the membrane 641 in the expansion tank 62, it can also be provided in an additional expansion tank.

Figure 5:
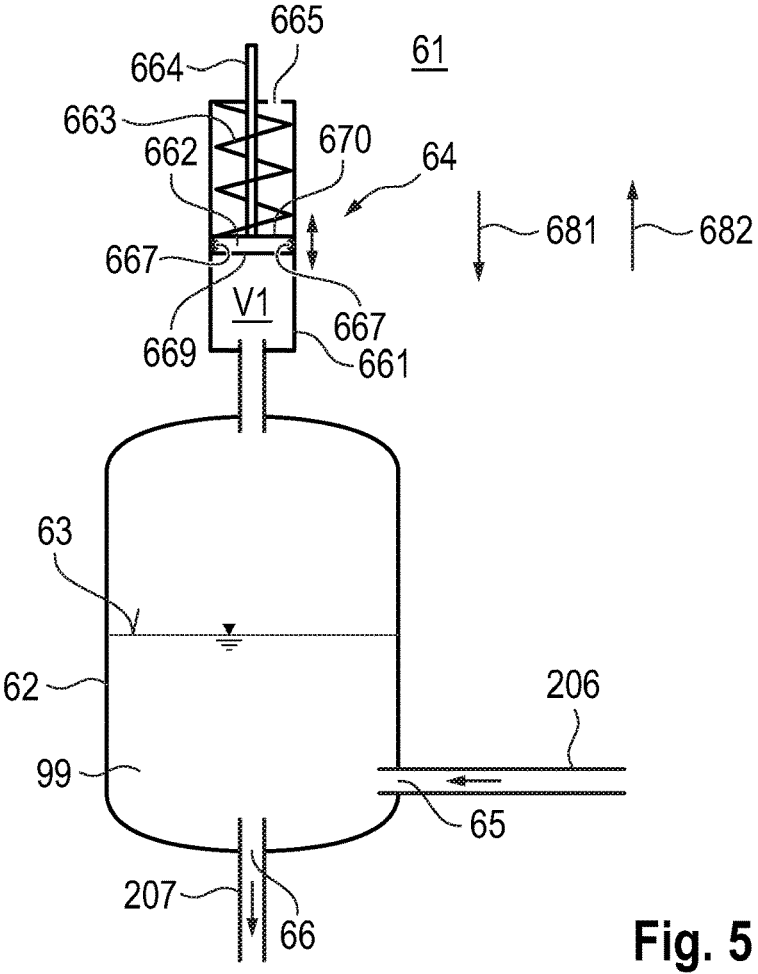
FIG. 5 illustrates a second embodiment of the expansion tank of FIG. 3.

FIG. 5 shows a further embodiment of the volume change assembly 64.

The volume change assembly 64 comprises a body 661 and an element 662 that is displaceable within the body 661. The body 661 defines the first volume V1 as a function of the position of the displaceable element 662. The body 661 is fluidically connected to the expansion tank 62 on a side 669 of the displaceable element 662. Upon a displacement of the displaceable element 662 in a first direction 681, the first volume V1 decreases, and upon a displacement in the opposite second direction 682, the first volume V1 increases.

In the embodiment example, the displaceable element 662 comprises a sealing element 667, which sealing element 667 is configured so as to enable a sealing of the region between the displaceable element 662 and the body 661 and thus a sealing between the sides 669 and 670 of the displaceable element 662. The sealing element 667 is e.g. configured as a sealing lip or as an O-ring.

In the embodiment example, the displaceable element 662 comprises a rod 664 that is guided in the body 661. As a result, the guide apparatus formed by the rod 664 and the body 661 is configured so as to guide the displaceable element 662 relative to the body 661. This results in a defined movement of the displaceable element 662. In the embodiment example, the body 661 on the side 670 of the displaceable element 662 has an opening 665 through which the body 661 is fluidically connected to the outer environment 61 on the side facing away from the first volume V1. Alternatively, the first body 661 can be arranged on the side 670 of the movable element 662 in a closed position, and thus a minor escape of coolant between the body 661 and the displaceable element 662 due to a leak less critical, because there is no contact with the outer environment 61.

In the embodiment example, the volume change assembly 64 comprises a spring element 663, which spring element 663 is configured so as to apply a force onto the displaceable element 662. The force is configured so as to increase or decrease a pressure in the first volume V1. Thus, upon a strong volume expansion of the coolant 99 by the spring element 663, a counter-force can be produced, and this results in an increase in the pressure in the expansion tank 62. Conversely, if, for example, the coolant 99 takes up a lower volume in high cold temperatures, the movable element 662 is moved such that the first volume V1 decreases. Here, the spring element 663 can cause a counter-force, thereby preventing too strong a movement of the displaceable element 662.

The volume change assembly can also be formed together with the expansion tank 62 by providing the movable element 662 within the expansion tank 62. For example, a cylindrical shape of the expansion tank 62 is advantageous.

Many variants and modifications are of course possible within the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A drive unit for an electric vehicle, comprising:
an electric motor for propulsion; and
a cooling system,
wherein the electric motor comprises a stator assembly and a rotor assembly,
wherein the stator assembly comprises a stator housing, a stator core with grooves, and a winding assembly,
wherein the winding assembly extends through the grooves, wherein the stator housing comprises a stator housing inlet and a stator housing outlet,
wherein the grooves are fluidically connected to the stator housing inlet and with the stator housing outlet,
wherein the cooling system comprises a first cooling circuit, a second cooling circuit, a third cooling circuit, and a pumping apparatus,
wherein the first cooling circuit is connected to the stator housing inlet and to the stator housing outlet so as to enable a direct cooling of the winding assembly,
wherein the first cooling circuit comprises an expansion tank assembly, the expansion tank assembly comprising an expansion tank, an expansion tank inlet, an expansion tank outlet, and a volume change assembly,
wherein the expansion tank is connected to the first cooling circuit via the expansion tank inlet and the expansion tank outlet,
wherein the volume change assembly has a first volume and is configured as a closed volume change assembly without fluidic connection to an outer environment of the drive unit,
wherein the volume change assembly is configured to enable a change of the first volume and thus of a total volume of the first cooling circuit as a function of the pressure in the first cooling circuit such that, as the pressure in the first cooling circuit increases, the first volume is at least partially increased and, as the pressure in the first cooling circuit decreases, the first volume is at least partially reduced,
wherein the volume change assembly comprises a displaceable element including a rod that is guided within a body of the volume change assembly,
wherein the pumping apparatus comprises a first pump and a second pump,
wherein the first pump is configured to convey a first coolant in the first cooling circuit,
wherein the second pump is configured to convey a second coolant in the second cooling circuit,
wherein the first cooling circuit comprises a first heat exchanger and the second cooling circuit comprises a second heat exchanger, and
wherein the third cooling circuit is configured to cool the first heat exchanger and the second heat exchanger.

2. The drive unit according to claim 1, wherein the first cooling circuit comprises the first coolant and the second cooling circuit comprises the second coolant.

3. The drive unit according to claim 2, wherein the first coolant is a dielectric coolant.

4. The drive unit according to claim 1, wherein the volume change assembly comprises a membrane configured to enable a volume change of the first volume by a shape change.

5. The drive unit according to claim 4, wherein the membrane is arranged in the expansion tank.

6. The drive unit according to claim 4, wherein the membrane comprises a first side facing the expansion tank inlet and a second side opposite the first side, and
wherein the membrane is configured to produce a seal between the first side and the second side.

7. The drive unit according to claim 6, wherein the second side of the membrane is fluidically connected to the outer environment of the drive unit.

8. The drive unit according to claim 6, wherein the second side of the membrane is not fluidically connected to the outer environment of the drive unit.

9. The drive unit according to claim 1, wherein the volume change assembly comprises a body having an element that is displaceable within the body, wherein the body, together with the displaceable element, defines the first volume, and wherein the displaceable element is configured to bring about a volume change of the first volume by a displacement relative to the body.

10. The drive unit according to claim 9, wherein the displaceable element comprises a sealing element configured to enable a sealing of a region between the displaceable element and the body.

11. The drive unit according to claim 9, wherein the volume change assembly comprises a guide apparatus configured to guide the displaceable element relative to the body.

12. The drive unit according to claim 9, wherein the volume change assembly comprises a spring configured to apply a force onto the displaceable element, and wherein the force is configured to increase or decrease a pressure in the first volume.

13. An electric vehicle having the drive unit according to claim 1.

14. The drive unit according to claim 10, wherein the sealing element is configured as a sealing lip or as an O-ring.

15. The drive unit according to claim 2, wherein the first coolant and the second coolant are different.

16. The drive unit according to claim 2, wherein the second coolant comprises gear oil or engine oil.

17. A drive unit for an electric vehicle, comprising:

an electric motor for propulsion; and a cooling system, wherein the electric motor comprises a stator assembly and a rotor assembly, wherein the stator assembly comprises a stator housing, a stator core with grooves, and a winding assembly, wherein the winding assembly extends through the grooves, wherein the stator housing comprises a stator housing inlet and a stator housing outlet, wherein the grooves are fluidically connected to the stator housing inlet and with the stator housing outlet, wherein the cooling system comprises a first cooling circuit, which is connected to the stator housing inlet and to the stator housing outlet so as to enable a direct cooling of the winding assembly, wherein the first cooling circuit comprises an expansion tank assembly, the expansion tank assembly comprising an expansion tank, an expansion tank inlet, an expansion tank outlet, and a volume change assembly, wherein the expansion tank is connected to the first cooling circuit via the expansion tank inlet and the expansion tank outlet, wherein the volume change assembly has a first volume and is configured as a closed volume change assembly without fluidic connection to an outer environment of the drive unit, wherein the volume change assembly is configured to enable a change of the first volume and thus of a total volume of the first cooling circuit as a function of the pressure in the first cooling circuit such that, as the pressure in the first cooling circuit increases, the first volume is at least partially increased and, as the pressure in the first cooling circuit decreases, the first volume is at least partially reduced, wherein the volume change assembly comprises a body and a displaceable element, the displaceable element being displaceable within the body, the displaceable element comprising a seal, which is configured to seal a region between the displaceable element and the body, and a rod, which is configured to cooperate with the body to guide the displaceable element relative to the body, wherein the body defines the first volume as a function of a position of the displaceable element, wherein the body is fluidically connected to the expansion tank, and wherein the displaceable element is configured to bring about a volume change of the first volume by a displacement relative to the body.

* * * * *